US008998162B1

(12) United States Patent
Gutha et al.

(10) Patent No.: US 8,998,162 B1
(45) Date of Patent: Apr. 7, 2015

(54) ANCHORING APPARATUS FOR A MECHANIZED IRRIGATION SYSTEM

(71) Applicants: Charles E. Gutha, Carter Lake, IA (US); Steven Jay Murphy, Bellwood, NE (US)

(72) Inventors: Charles E. Gutha, Carter Lake, IA (US); Steven Jay Murphy, Bellwood, NE (US)

( * ) Notice: Subject to any disclaimer, the term of this patent is extended or adjusted under 35 U.S.C. 154(b) by 235 days.

(21) Appl. No.: 13/685,891

(22) Filed: Nov. 27, 2012

(51) Int. Cl.
*F16M 13/00* (2006.01)
*A01G 25/09* (2006.01)

(52) U.S. Cl.
CPC ..................... *A01G 25/09* (2013.01)

(58) Field of Classification Search
USPC ......... 248/545, 500, 503, 508, 550, 680, 511, 248/512, 522, 530, 80, 83, 85, 87, 156; 52/155, 157; 239/722–749
See application file for complete search history.

(56) References Cited

U.S. PATENT DOCUMENTS

| | | | | |
|---|---|---|---|---|
| 2,801,132 A * | 7/1957 | Shuck | ............................ | 239/736 |
| 3,318,058 A * | 5/1967 | Sullivan | .......................... | 52/157 |
| 3,917,171 A * | 11/1975 | Reinke | ........................... | 239/728 |
| 3,961,671 A * | 6/1976 | Adams et al. | ...................... | 173/1 |
| 3,983,898 A * | 10/1976 | Zimmerer et al. | ............. | 239/731 |
| 4,163,459 A * | 8/1979 | Hegemann | ..................... | 239/728 |
| 4,209,035 A * | 6/1980 | Hait | ............................... | 239/728 |
| 4,330,085 A * | 5/1982 | Siekmeier et al. | ................ | 239/1 |
| 4,580,795 A * | 4/1986 | Burtelson et al. | ............... | 279/76 |
| 4,702,047 A * | 10/1987 | Stokes | ............................ | 52/156 |
| 4,877,189 A * | 10/1989 | Williams | ....................... | 239/749 |
| 5,515,656 A * | 5/1996 | Mihalich | ......................... | 52/155 |
| 5,779,163 A * | 7/1998 | Gunter | ........................... | 239/734 |
| 6,109,535 A * | 8/2000 | Korus | .............................. | 239/1 |
| 6,216,803 B1 * | 4/2001 | Deken | ............................ | 175/162 |
| 6,431,475 B1 * | 8/2002 | Williams | ....................... | 239/750 |
| 7,303,157 B1 | 12/2007 | Fixemer | | |
| 7,438,243 B1 | 10/2008 | Erickson | | |
| 2005/0040297 A1 * | 2/2005 | Saraf | .............................. | 248/156 |
| 2013/0018509 A1 * | 1/2013 | Korus | ............................ | 700/275 |

* cited by examiner

*Primary Examiner* — Monica Millner
(74) *Attorney, Agent, or Firm* — Dennis L. Thomte; Thomte Patent Law Office LLC

(57) ABSTRACT

An anchoring apparatus for a mechanized irrigation system wherein remotely controlled augers are mounted on the drive units of the irrigation system which may be driven into the ground to anchor the drive unit to the ground.

15 Claims, 6 Drawing Sheets

ANCHORING APPARATUS FOR A MECHANIZED IRRIGATION SYSTEM

BACKGROUND OF THE INVENTION

1. Field of the Invention

This invention relates to an anchoring apparatus for a mechanized irrigation machine or system and more particularly to a means for preventing the irrigation system from overturning in a high wind situation. More particularly, this invention prevents the system from overturning in a high wind situation by mounting a pair of anchor assemblies on one or more of the drive units of the irrigation system.

2. Description of the Related Art

Some irrigation systems or machines such as center pivot systems, lateral move systems and corner irrigation systems have a tendency to overturn or "tip over" when subjected to high winds. Some attempts have been made to prevent overturning of the irrigation systems such as seen in U.S. Pat. Nos. 7,303,157 and 7,438,243.

Although the systems of the above-identified patents do satisfactorily prevent the irrigation systems from overturning, Applicants believe that each of the systems of the above-identified patents has at least one shortcoming. Applicants believe that the system of U.S. Pat. No. 7,303,157 requires that a ballast tank be placed on one or more of the drive units and that water in the ballast tanks could freeze during the winter months. Applicants believe that the system of U.S. Pat. No. 7,438,243 has a shortcoming in that the irrigation system must be propelled around the field to the location of the embedded anchors. That process can take several hours due to the slow movement of the irrigation system.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An anchoring apparatus is provided for a mechanized irrigation system. The irrigation system includes an elongated water pipeline which is supported upon drive units which are spaced along the length of the pipeline. Each of the drive units includes an elongated main frame having drive wheels at the opposite ends thereof and a support frame structure extending upwardly from the main frame to the pipeline. The support frame structure of the drive unit includes first and second support frame members which extend upwardly and inwardly from one end of the main frame to the pipeline in a V-shaped manner and third and fourth support frame members which extend upwardly and inwardly from the other end of the main frame to the pipeline in a V-shaped manner. An elongated, horizontally extending, lower support bar is secured to and extends between the first and third support frame members of the support frame structure. An elongated, horizontally extending, upper support bar is secured to and extends between the first, third and fourth support frame members of the support frame structure above the lower support bar. The anchoring apparatus includes a first anchor assembly having an elongated frame which is operatively secured to the upper and lower support bars at one end thereof with the elongated frame of the first auger assembly having upper and lower ends. The elongated frame of the first auger assembly extends downwardly and outwardly from the upper end thereof to the lower end thereof. A first elongated auger anchor is longitudinally movably mounted on the frame of the first auger anchor assembly between upper and lower positions with the first auger anchor having upper and lower ends. The first auger anchor has an auger member mounted on the lower end thereof. A first selectively reversible motor is secured to the upper end of the first auger anchor to selectively rotate the first auger anchor in first and second opposite directions. The rotation of the first motor in the first direction causes the first auger anchor to move downwardly, with respect to the frame of the first auger assembly, from the upper position to the lower position which causes the first auger member thereon to auger into the ground to anchor the first auger anchor into the ground. The rotation of the first motor in the second direction causes the first auger anchor to move upwardly with respect to the frame of the first auger anchor assembly, from the lower position to the upper position thereby withdrawing the first auger member from the ground.

The anchoring apparatus of this invention also includes a second auger anchor assembly which includes an elongated frame which is secured to the upper and lower support bars at the other end thereof with the elongated frame of the second auger assembly having upper and lower ends. An elongated second auger anchor is longitudinally movably mounted on the frame of the second auger assembly between upper and lower positions. The second auger anchor has upper and lower ends and has an auger member mounted on the lower end thereof. A second selectively reversible motor is operatively secured to the upper end of the second auger anchor to selectively rotate the second auger anchor in first and second opposite directions. The rotation of the second motor in the first direction causes the second auger anchor to move downwardly, with respect to the frame of the second auger anchor assembly, from the upper position to the lower position which causes the auger member thereon to auger into the ground to anchor the second auger anchor into the ground. The rotation of the second motor in the second direction causes the second auger anchor to move upwardly, with respect to the frame of the second auger anchor assembly, from the lower position to the upper position thereby withdrawing the second auger member from the ground.

The anchoring apparatus of this invention may be mounted on all of the drive units of the irrigation system or just some of the drive units of the irrigation system.

It is therefore a principal object of the invention to provide an anchoring apparatus for a mechanized irrigation system.

A further object of the invention is to provide an anchoring apparatus for a mechanized irrigation system which anchors one or more of the drive units of the irrigation system to the ground thereby preventing the system from overturning.

A further object of the invention is to provide an anchoring apparatus for a mechanized irrigation system which may be remotely controlled.

A further object of the invention is to provide an anchoring apparatus for a mechanized irrigation system which may anchor a drive unit to the ground at any location in the field being irrigated.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
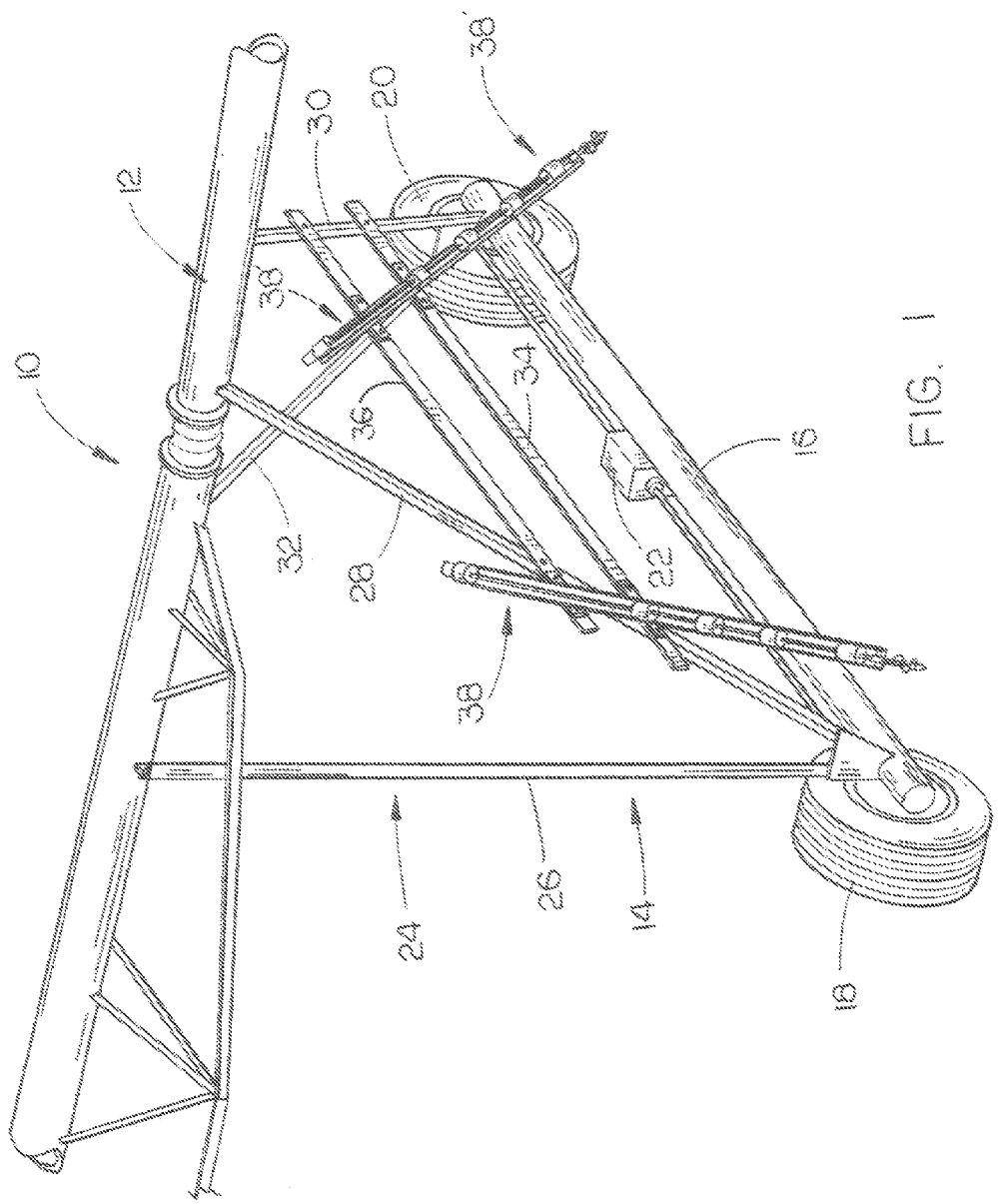
FIG. 1 is a partial perspective view of a mechanized irrigation system having the anchoring apparatus of this invention mounted thereon.

FIG. 1 illustrates a portion of a conventional mechanized irrigation system 10 which may be a center pivot irrigation system, a lateral or linear irrigation system, or a corner pivot irrigation system. The system 10 includes a water pipeline 12 which is supported upon a plurality of drive units or towers 14 which propel the system 10 across the area to be irrigated. Each of the drive units 14 includes an elongated main beam 16 having drive wheels 18 and 20 rotatably mounted on the opposite ends thereof. The drive wheels 18 and 20 are driven by an electric or hydraulic drive motor 22 in conventional fashion.

The numeral 24 refers to a support structure which extends between the main beam 16 and the water pipeline 12 in conventional fashion. In some irrigation systems, the support structure 24 includes support members 26, 28, 30 and 32. The lower ends of support members 26 and 28 are secured to one end of beam 16 and extend upwardly from beam 16 in a V-shaped manner with the upper ends of the support members 26 and 28 being secured to the water pipeline 12. The lower ends of support members 30 and 32 are secured to the other end of beam 16 and extend upwardly from beam 16 in a V-shaped manner with the upper ends of the support members being secured to the water pipeline 12.

In other irrigation systems, the support structure at each drive unit is comprised of a first support member which extends between one end of the main beam and the water pipeline and a second support member which extends between the other end of the main beam and the water pipeline.

As seen in the drawings, an elongated bar 34 is secured to support members 28 and 30 by any conventional means and extends therebetween as seen in FIG. 1. The numeral 36 refers to an elongated bar which is secured to support member 28 by any convenient means and extends therebetween above bar 34. Although a pair of bars 34 and 36 are shown in the drawings, three or more vertically spaced bars may be utilized.

The numerals 38 and 38 refer to first and second anchoring assemblies which are identical except for the fact that anchoring assembly 38 is a "right hand" anchoring assembly and anchoring assembly 38' is a "left hand" anchoring assembly. Inasmuch as the assemblies 38 and 38' are identical, only assembly 38 will be described in detail with identical structure on assembly 38' being designated with "'".

Anchoring assembly 38 includes an elongated channel-shaped frame member 36 having an upper end 42 and a lower end 44. A plurality of spaced-apart cylindrical or tubular body segments 46 are welded to frame member 40. A pair of elongated toothed guides 48 and 50 are positioned within body segments 46 and are welded thereto so as to be radially spaced 180 degrees from one another. Although two guides 48 and 50 are shown, three or more toothed guides may be utilized which are radially spaced apart in the interior of the body segments 46. A pair of spaced-apart mounting brackets 52 and 54 are welded to frame member 46 for attachment to bars 34 and 36 respectively.

Although two brackets 52 and 54 are illustrated, the number of those brackets would depend upon the number of the bars which are utilized.

Figure 2:
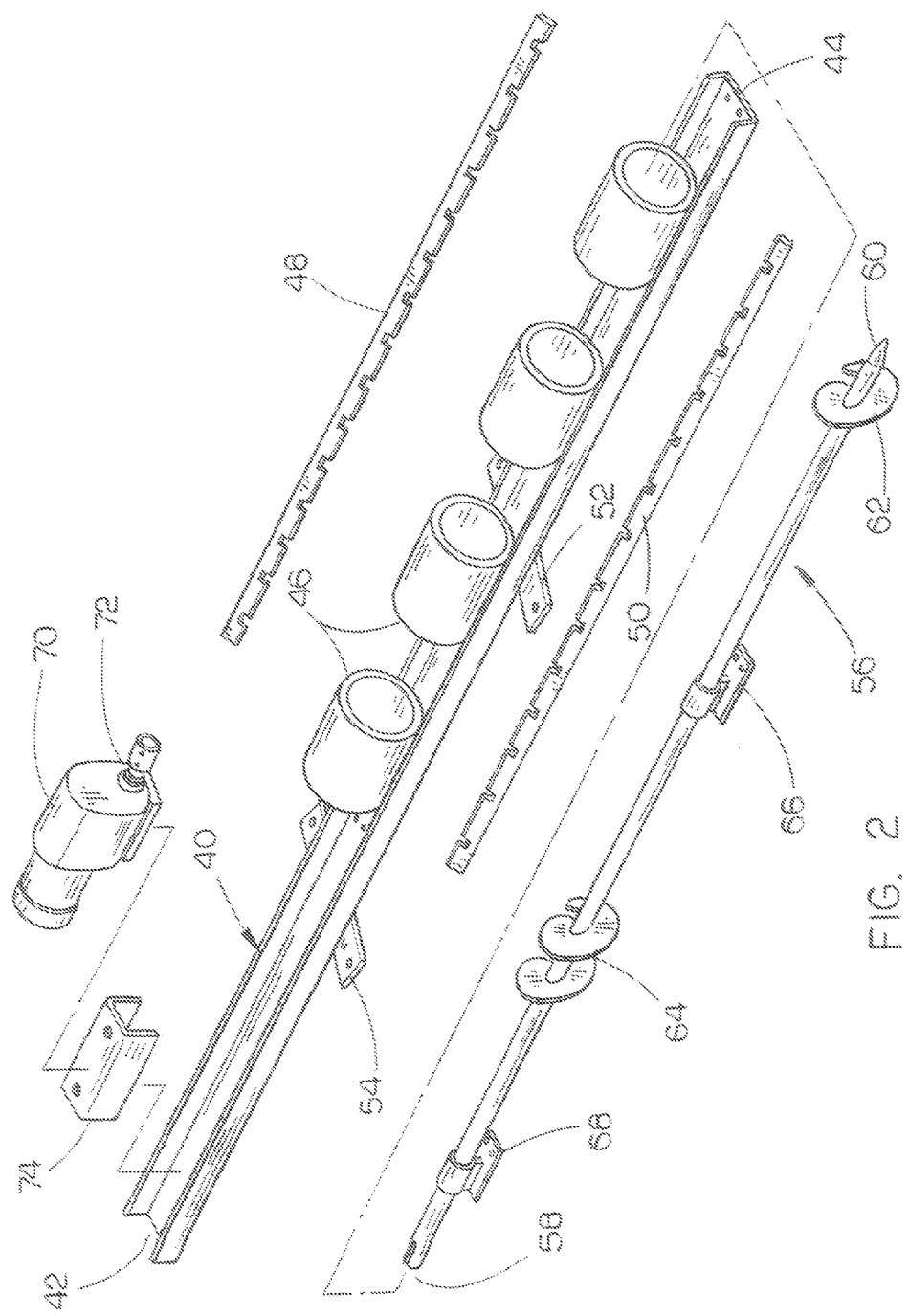
FIG. 2 is an exploded perspective view of the anchoring apparatus.
Figure 3:
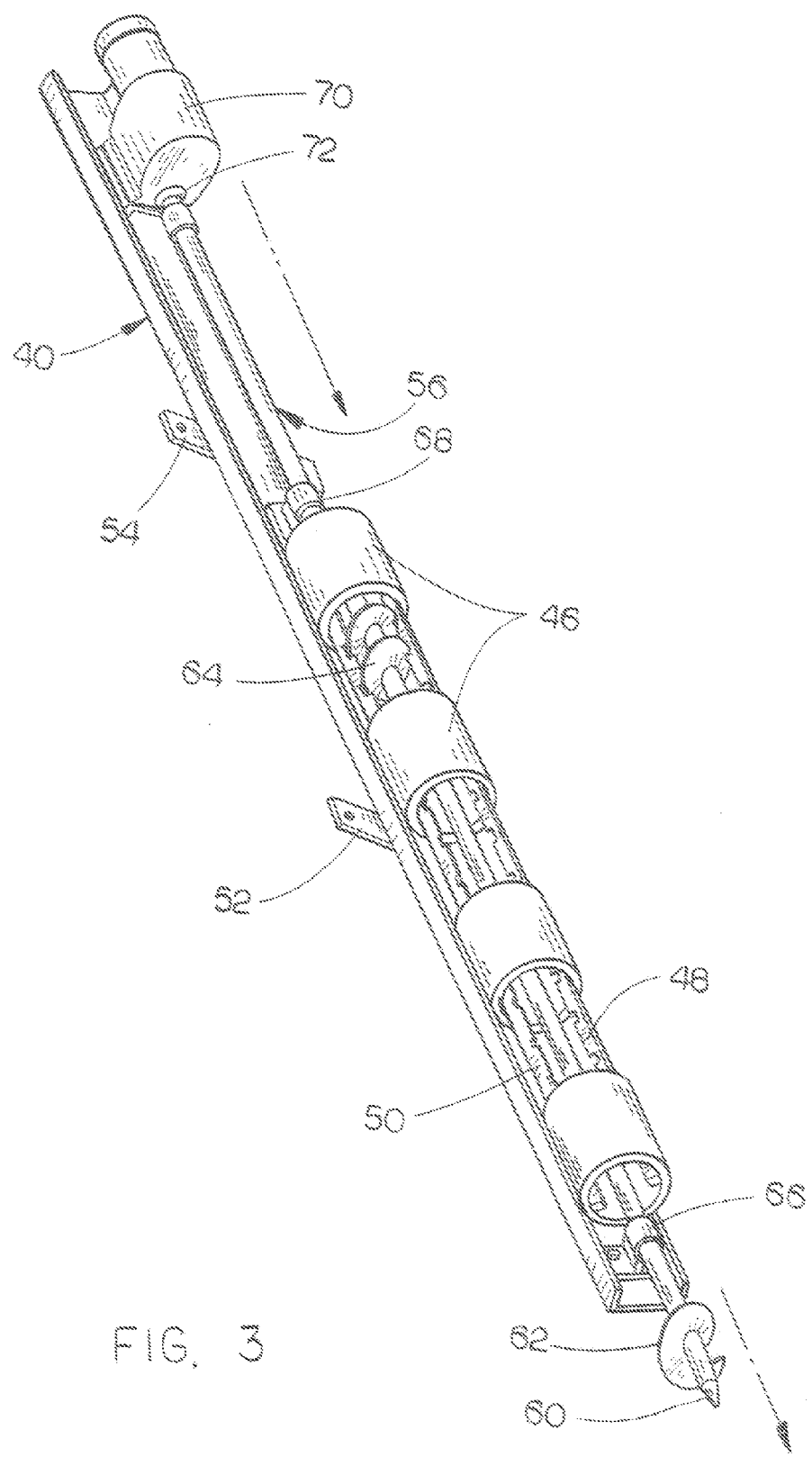
FIG. 3 is a perspective view of the anchoring apparatus.
Figure 4:
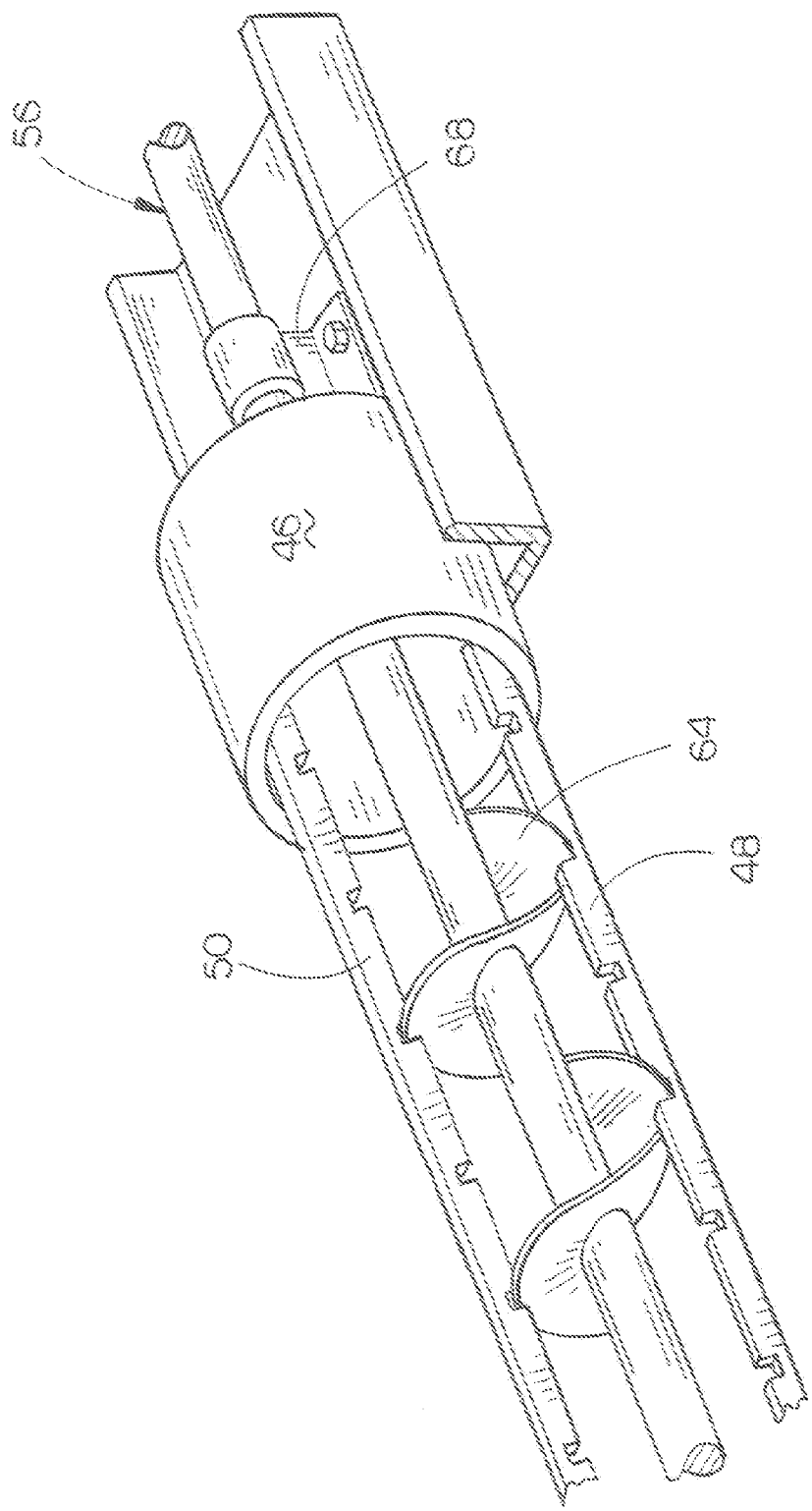
FIG. 4 is a partial perspective view of the anchoring apparatus.
Figure 5:
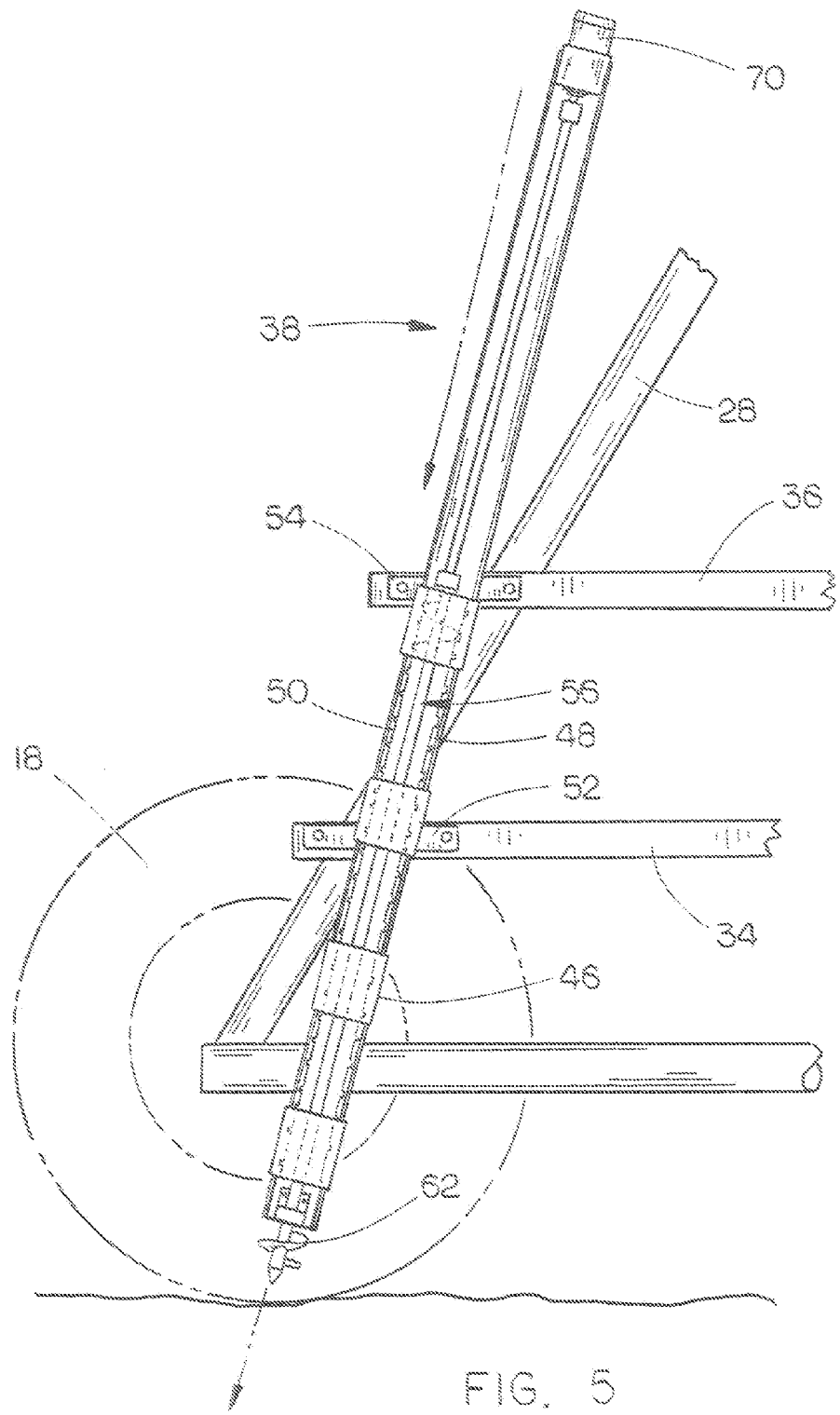
FIG. 5 is a partial elevational view illustrating the anchoring apparatus of his invention mounted on the drive unit of the irrigation system.
Figure 6:
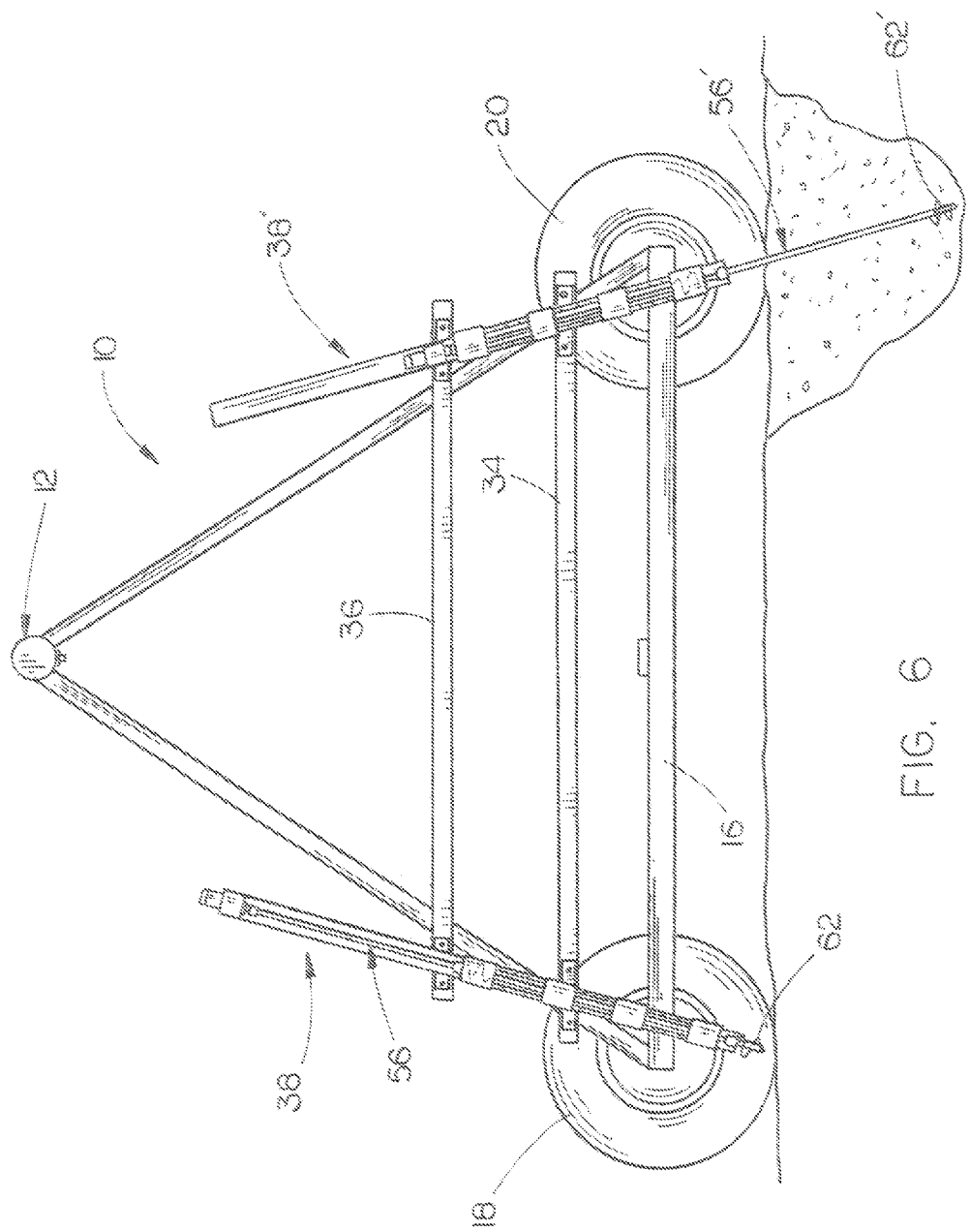
FIG. 6 is a view illustrating one of the anchoring assemblies of this invention being inserted into the ground.

The numeral 56 refers to an elongated rod, pipe or shaft having an upper end 58 and a lower pointed end 60. A helical auger member 62 is secured to shaft 56 and the lower end thereof. A helical section or screw 64 is secured to shaft 56 between the upper and lower ends thereof, as seen in FIG. 2. The numeral 66 refers to a lower shaft mount which rotatably receives shaft 56 extending therethrough. The numeral 68 refers to an upper shaft mount which rotatably receives shaft 56 extending therethrough. Shaft 56 is rotatably positioned within body segments 46 with mounts 66 and 68 being secured to frame member 40 by screws or the like. When shaft 56 is positioned within the body segments 46, the screw 64 is in meshing engagement with the toothed guides 48 and 50 so that rotation of shaft in one direction will cause shaft 56 to move downwardly with respect to frame member 40 and the body segments 46 and so that rotation of shaft 56 in an opposite direction will cause shaft 56 to move upwardly with respect to frame member 40 and the body segments.

A selectively reversible motor 70, either electric or hydraulic, has its drive shaft 72 secured to the upper end 58 of shaft 56. A frame 74 is secured to motor 70 and is slidably received by the channel-shaped frame member 40.

The anchoring apparatus of this invention enables the mechanized irrigation system to be anchored at any location in the field within moments. The motors 70 and 70' will be activated when the irrigation system is turned off either manually or remotely by wireless means. The anchoring apparatus may also be activated automatically when a sever weather signal is received.

When the irrigation system is stopped, the activation of the motors 70 and 70' to rotate the shafts 56 and 56' cause the shafts 56 and 56' to move downwardly from the drive unit with the auger members thereon digging into the ground to anchor the drive unit to the ground to prevent the drive unit from tipping over in a high wind situation.

When it is desired to again irrigate, the drive motors 70 and 70' are rotated in the opposite direction so that the auger members are raised out of ground engagement.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since any embodiments of the invention can be practiced without departing from the spirit and scope of the invention, the invention resides in the claims hereinafter appended.

We claim:
1. A self-propelled irrigation system, comprising:
an elongated water pipeline supported upon drive units which are spaced along the length of said pipeline;
each of said drive units including an elongated main frame having drive wheels at the opposite ends thereof and a support frame extending upwardly from said main frame to said pipeline;
said support frame including first and second support frame members which extend upwardly and inwardly from one end of said main frame to said pipeline in a V-shaped manner and third and fourth support frame members which extend upwardly and inwardly from the other end of said main frame to said pipeline in a V-shaped manner;
an elongated lower support bar, having first and second ends, secured to said first and third support frame members which extends therebetween in a horizontal manner;
an elongated upper support bar, having first and second ends, secured to said first and third support frame members which extends therebetween in a horizontal manner;
a first auger anchor assembly including an elongated frame which is secured to said upper and lower support bars at said first ends thereof;
said elongated frame of said first auger anchor assembly having upper and lower ends;
said elongated frame of said first auger anchor assembly extending downwardly and outwardly from said upper end thereof to said lower end thereof;
a first elongated auger anchor longitudinally movably mounted on said frame of said first auger anchor assembly between upper and lower positions;
said first auger anchor having upper and lower ends;
said first auger anchor having an auger member mounted on said lower end thereof;
a first selectively reversible motor operatively secured to said upper end of said first auger anchor to selectively rotate said first auger anchor in first and second opposite directions;
the rotation of said first motor in said first direction causing said first auger anchor to move downwardly, with respect to said frame of said first auger anchor assembly, from said upper position to said lower position to cause said auger member thereon to auger into the ground to anchor said first auger anchor in the ground;
the rotation of said first motor in said second direction causing said first auger anchor to move upwardly, with respect to said frame of said first auger anchor assembly, from said lower position to said upper position thereby withdrawing said auger member thereon from the ground;
a second auger anchor assembly including an elongated frame which is secured to said upper and lower support bars at said second ends thereof;
said elongated frame of said second auger anchor assembly having upper and lower ends;
a second elongated auger anchor longitudinally movably mounted on said frame of said second auger anchor assembly between upper and lower positions;
said second auger anchor having upper and lower ends;
said second auger anchor having an auger member mounted on said lower end thereof;
and a second selectively reversible motor operatively secured to said upper end of said second auger anchor to selectively rotate said second auger anchor in first and second opposite directions;
the rotation of said second motor in said first direction causing said second auger anchor to move downwardly, with respect to said frame of said second auger anchor assembly, from said upper position to said lower position and to cause said auger member thereon to auger into the ground to anchor said second auger anchor into the ground;
the rotation of said second motor in said second direction causing said second auger anchor to move upwardly, with respect to said frame of said second auger anchor assembly, from said lower position to said upper position thereby withdrawing said auger member thereon from the ground.

2. The system of claim 1 wherein said first and second motors are remotely controlled.

3. The system of claim 1 wherein said first and second motors are activated when the irrigation system is shut down.

4. The system of claim 1 wherein said first and second motors are activated upon receiving a severe weather signal.

5. The system of claim 1 wherein said first and second motors are manually activated.

6. A self-propelled irrigation system, comprising;
an elongated water pipeline supported upon drive units which are spaced along the length of said pipeline;
each of said drive units including an elongated main frame having drive wheels at the opposite ends thereof and a support frame extending upwardly from said main frame to said pipeline;
an upstanding anchor assembly including a frame, having upper and lower ends, which is operatively secured to one of said drive units;
an elongated auger anchor longitudinally movably mounted on said frame of said upstanding anchor assembly between upper and lower positions;
said auger anchor having an auger member mounted on said lower end thereof;
a selectively reversible motor operatively secured to said upper end of said auger anchor to selectively rotate said auger anchor in first and second opposite directions;
the rotation of said motor in said first direction causing said auger anchor to move downwardly, with respect to said frame of said auger anchor assembly, from said upper position to said lower position to cause said auger member thereon to auger into the ground to anchor said auger anchor in the ground;
the rotation of said motor in said second direction causing said auger anchor to move upwardly, with respect to said frame of said auger anchor assembly, from said lower position to said upper position thereby withdrawing said auger member thereon from the ground.

7. The system of claim 6 wherein said motor is remotely controlled.

8. The system of claim 6 wherein said motor is activated when the irrigation system is shut down.

9. The system of claim 6 wherein said motor is activated upon receiving a severe weather signal.

10. The system of claim 6 wherein said motor is manually activated.

11. A self-propelled irrigation system, comprising:
an elongated water pipeline supported upon drive units which are spaced along the length of said pipeline;

each of said drive units including an elongated main frame having drive wheels at the opposite ends thereof and a support frame extending upwardly from said main frame to said pipeline;

a first auger assembly;

said first auger assembly including a frame which is operatively secured to at least one of said drive units at one end of said main frame;

said frame of said first auger assembly including an auger member having upper and lower ends associated therewith which may be selectively driven into the ground;

a first reversible motor secured to said upper end of said auger member of said first auger assembly for rotating said auger member of said first auger assembly;

a second auger assembly;

said second auger assembly including a frame which is operatively secured to said drive unit at the other end of said main frame;

said frame of said second auger assembly including an auger member having upper and lower ends associated therewith which may be selectively driven into the ground;

a second reversible motor secured to said upper end of said first auger assembly for rotating said auger member of said second auger assembly.

12. The system of claim 11 wherein said reversible motors are remotely controlled.

13. The system of claim 11 wherein said reversible motors are activated when the irrigation system is shut down.

14. The system of claim 11 wherein said reversible motors are activated upon receiving a severe weather signal.

15. The system of claim 11 wherein said reversible motors are manually activated.

* * * * *